(12) United States Patent
Reneau

(10) Patent No.: US 12,668,988 B2
(45) Date of Patent: Jun. 30, 2026

(54) FLAGPOLE SECURITY CAMERA SYSTEM

(71) Applicant: Robert Reneau, Bakersfield, CA (US)

(72) Inventor: Robert Reneau, Bakersfield, CA (US)

( * ) Notice: Subject to any disclaimer, the term of this patent is extended or adjusted under 35 U.S.C. 154(b) by 7 days.

(21) Appl. No.: 18/805,456

(22) Filed: Aug. 14, 2024

(65) Prior Publication Data

US 2026/0049499 A1    Feb. 19, 2026

(51) Int. Cl.
| | |
|---|---|
| *E04H 12/32* | (2006.01) |
| *E04H 12/00* | (2006.01) |
| *E04H 12/18* | (2006.01) |
| *H02S 20/10* | (2014.01) |
| *G03B 17/56* | (2021.01) |

(52) U.S. Cl.
CPC ............ *E04H 12/32* (2013.01); *E04H 12/18* (2013.01); *H02S 20/10* (2014.12); *G03B 17/561* (2013.01)

(58) Field of Classification Search
CPC ......... E04H 12/32; E04H 12/18; E04H 12/00; E04H 12/34; H02S 20/10; G03B 17/561; F21V 21/116
USPC .......................................................... 248/511
See application file for complete search history.

(56) References Cited

U.S. PATENT DOCUMENTS

| | | | | | |
|---|---|---|---|---|---|
| 2,271,609 | A | * | 2/1942 | Hall | G09F 17/00 52/294 |
| 2,672,118 | A | * | 3/1954 | Martin | E04H 12/32 116/174 |

| | | | | | |
|---|---|---|---|---|---|
| 3,630,474 | A | * | 12/1971 | Minor | E01F 9/635 404/9 |
| 3,963,210 | A | * | 6/1976 | Macklin | E04G 21/185 249/91 |
| 5,096,022 | A | * | 3/1992 | Bowers | G09F 17/00 188/65.1 |
| 5,315,955 | A | * | 5/1994 | Feliz | G09F 17/00 116/173 |
| 5,454,202 | A | * | 10/1995 | van der Weijden | G09F 17/00 70/57 |
| 5,505,033 | A | * | 4/1996 | Matsuo | E02D 27/42 52/169.9 |
| 6,447,150 | B1 | * | 9/2002 | Jen | G08B 13/19619 362/403 |
| 6,815,607 | B1 | * | 11/2004 | Gingras | H01R 4/66 174/6 |
| 7,275,495 | B2 | * | 10/2007 | Lawrence | G09F 17/00 362/431 |
| 7,699,508 | B2 | * | 4/2010 | Schroeder | G09F 17/00 362/431 |

(Continued)

*Primary Examiner* — Nkeisha Smith

(57) ABSTRACT

A flagpole security camera system is provided which utilizes an elongate vertical support member having a proximal terminal end and a distal terminal end. The proximal terminal end may be coupled to a base support structure. The base support structure may be coupled to one or more retention elements. The distal terminal end may be disposed adjacent a camera system and a revolving truck. The flagpole security camera system may further utilize an anchor structure having a fill material. The one or more retention elements may be disposed within the fill material. A grounding element may be coupled to the one or more retention elements. Further, a photovoltaic element may be disposed adjacent the elongate vertical support member and in electrical communication with the camera system.

13 Claims, 8 Drawing Sheets

(56)                References Cited

U.S. PATENT DOCUMENTS

| | | | | |
|---|---|---|---|---|
| 8,057,078 | B1 * | 11/2011 | Ko | G09F 23/04 |
| | | | | 362/253 |
| 8,215,807 | B1 * | 7/2012 | Brunesti | G09F 17/00 |
| | | | | 362/800 |
| 8,281,531 | B2 * | 10/2012 | Dent | E02D 27/32 |
| | | | | 52/297 |
| 8,720,836 | B2 * | 5/2014 | Hogan | A47G 7/044 |
| | | | | 40/606.14 |
| 8,967,072 | B2 * | 3/2015 | Chen | E04H 12/32 |
| | | | | 116/173 |
| 9,316,365 | B1 * | 4/2016 | Ko | F21V 33/00 |
| 9,642,186 | B1 * | 5/2017 | Dureja | H04W 88/10 |
| 9,732,899 | B2 * | 8/2017 | Hogan | A47G 7/044 |
| 10,483,790 | B2 * | 11/2019 | Tuerk | H05B 47/11 |
| 10,801,229 | B1 * | 10/2020 | George, Sr. | E04H 12/32 |
| 10,853,752 | B2 * | 12/2020 | Bayges | H04W 4/44 |
| 10,973,289 | B2 * | 4/2021 | Cowgill | A45B 25/10 |
| 11,846,409 | B2 * | 12/2023 | Pitcher | F21V 21/116 |
| 11,942,000 | B1 * | 3/2024 | Levy | G09F 13/30 |
| 11,991,944 | B2 * | 5/2024 | Porth | G01C 15/002 |
| 12,002,382 | B2 * | 6/2024 | Hayes | G09F 17/00 |
| 12,031,345 | B2 * | 7/2024 | Cochrane | E04H 12/2261 |
| 12,146,333 | B1 * | 11/2024 | Ko | E04H 12/32 |
| 12,230,166 | B2 * | 2/2025 | Wight | G09F 17/00 |
| 2006/0044789 | A1 * | 3/2006 | Curtis | G08B 13/19632 |
| | | | | 362/153.1 |
| 2007/0120035 | A1 * | 5/2007 | Albanese | E04H 12/2269 |
| | | | | 248/530 |
| 2008/0055409 | A1 * | 3/2008 | Mars | G03B 37/02 |
| | | | | 348/E5.026 |
| 2008/0231707 | A1 * | 9/2008 | Fontana | G08B 13/19632 |
| | | | | 348/158 |
| 2009/0229967 | A1 * | 9/2009 | Sakatani | B01J 35/39 |
| | | | | 204/157.3 |
| 2009/0290365 | A1 * | 11/2009 | Schroeder | G09F 17/00 |
| | | | | 362/431 |
| 2010/0101479 | A1 * | 4/2010 | Grahl | E04H 12/32 |
| | | | | 116/173 |
| 2010/0224385 | A1 * | 9/2010 | Gordin | H01R 4/66 |
| | | | | 174/6 |
| 2012/0020060 | A1 * | 1/2012 | Myer | H02S 40/38 |
| | | | | 362/183 |
| 2015/0009659 | A1 * | 1/2015 | Werner | F21K 9/20 |
| | | | | 362/183 |
| 2023/0023407 | A1 * | 1/2023 | Garlock | H04N 7/183 |
| 2024/0209652 | A1 * | 6/2024 | Jang | E04H 12/32 |

* cited by examiner

200a

410

412

420

430

432

434

440

444

446

450

436

442

400

510c →

— 530

520c —

← 510b

— 520b

520a —

510a →

500

FLAGPOLE SECURITY CAMERA SYSTEM

BACKGROUND OF THE INVENTION

The industry of security cameras and similar surveillance systems has evolved significantly over the past few decades. Initially, security cameras were primarily used in commercial and public spaces, often mounted on building exteriors, light poles, and dedicated surveillance towers. The development of more advanced camera technology, including high-resolution imaging, night vision, and motion detection, has expanded their use to residential and other less conventional settings, such as flagpoles and related objects with ideal vantage points.

Despite these advancements, several gaps and needs remain in the industry. Traditional security cameras, while effective, often face limitations related to their fixed positions, limited power supply options, and vulnerability to environmental conditions. Moreover, many existing systems require complex installation procedures and frequent maintenance to ensure optimal performance. There is a growing need for more versatile, autonomous, and environmentally resilient surveillance solutions.

A review of existing related flagpole security camera products reveals a limited selection. Most mounted cameras are simple modifications of standard security cameras, adapted with basic mounting hardware. These products typically lack advanced features such as integrated power systems, automated maintenance capabilities, and robust environmental protection. Furthermore, the integration of renewable energy sources, such as solar power, is often rudimentary or nonexistent, limiting the operational duration and reliability of these systems.

The existing problems and needs given the current state of related flagpole security camera products include significant power supply limitations, as many systems rely on external power sources or batteries that require frequent recharging or replacement. Additionally, these systems face maintenance challenges, with camera lenses and other components prone to accumulating dirt, dust, and water, which degrade image quality and necessitate regular cleaning. Environmental vulnerability is another issue, as exposure to harsh weather conditions can damage components and disrupt functionality. Furthermore, fixed positioning restricts the camera's field of view, reducing its effectiveness in comprehensive surveillance. Lastly, many systems involve cumbersome installation processes, which deter potential users.

Furthermore, the lack of a 360-degree rotational mounting is a significant disadvantage of existing camera mounts. Most current systems offer limited rotational capabilities, restricting the camera's ability to provide a full panoramic view. This limitation severely reduces the effectiveness of the camera in providing comprehensive surveillance, as it cannot cover all angles and may leave blind spots that can be exploited. The ability to rotate freely in a complete circle would enable continuous monitoring of the entire surrounding area, significantly enhancing the security coverage provided by the system.

Additionally, typical cumbersome installation processes further exacerbate the usability issues of existing systems. Many security camera installations require professional assistance, involving complex steps such as drilling into structures, running extensive wiring, and ensuring proper alignment and calibration of the camera. This complexity not only increases the cost and time required for installation but also discourages potential users from adopting such systems, particularly in residential settings. Simplifying the installation process by designing more user-friendly mounting mechanisms and reducing the need for extensive wiring would make these systems more accessible and attractive to a broader range of users. These improvements are crucial for increasing the adoption and effectiveness of flagpole security camera systems in various applications.

A device such as the flagpole security camera system described herein could potentially solve these problems and meet the identified needs. By integrating advanced features such as photovoltaic cells for solar power generation, a self-cleaning camera lens, and automated remote control capabilities, this system offers a more autonomous and resilient solution. The inclusion of a robust protective seal and advanced coupling mechanisms ensures durability and ease of maintenance. Furthermore, the system's ability to pan, tilt, and zoom provides comprehensive surveillance coverage, enhancing security and monitoring effectiveness. Such innovations address the current limitations in the market and represent a significant advancement in the field of security camera systems.

DETAILED DESCRIPTION OF THE INVENTION

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "a flagpole security camera system" or any of its constituent parts also includes a plurality of flagpole security camera systems or any of its constituent parts and the like.

Figure 1A:
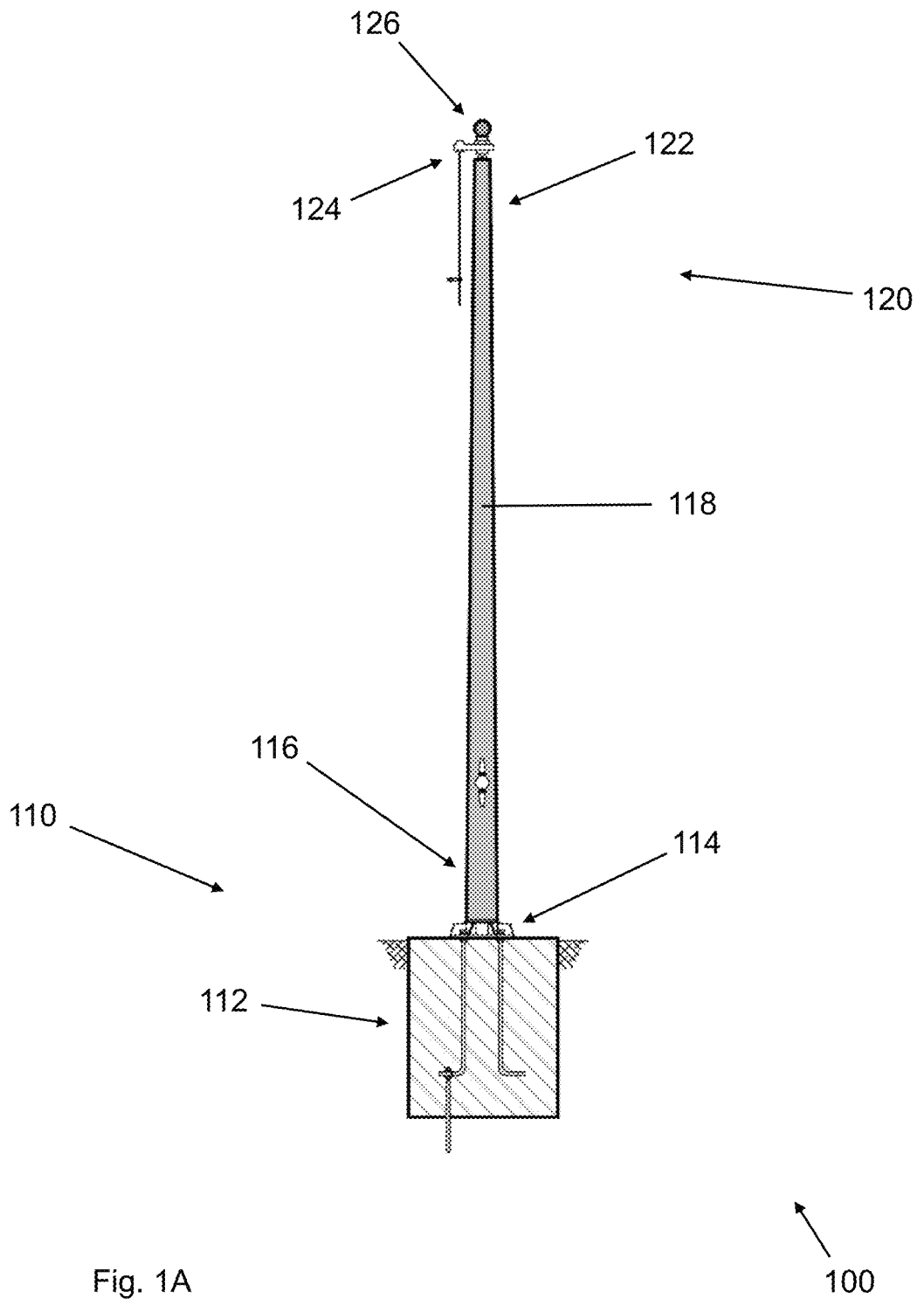
FIG. 1A illustrates an elevational view of a flagpole security camera system secured within an anchor structure shown in phantom in accordance with some embodiments of the present invention.

Exemplary embodiments of the present invention are illustrated in the accompanying figures. As shown in FIG. 1A, an elevational view of a flagpole security camera system 100 secured within an anchor structure 112 shown in phantom is provided. The flagpole security camera system 100 may comprise a bottom portion 110 and a top portion 120. The bottom portion 110 may comprise the anchor structure 112 having a base support structure 114 disposed thereupon. The base support structure 114 may secure a bottom portion 116 of an elongate vertical support member 118 in place to orient the flagpole security camera system 100 in parallel with a vertical axis running through the width-wise midpoint of the member 118.

The top portion 120 of the flagpole security camera system 100 may comprise a top portion 122 of an elongate vertical support member 118. The top portion 122 of the elongate vertical support member 118 may comprise a width or diameter dimension that is smaller than that of a width or diameter dimension of the bottom portion 116 of the elongate vertical support member 118. Additionally, the top portion 120 may further comprise a revolving truck 124 having a halyard and counterweight disposed thereunder. The revolving truck 124 may further comprise a camera system 126 disposed thereover. The camera system 126 may be implemented as a spherical camera or a dome camera that allows the camera system 126 to swivel through a 360 degree rotational degree of freedom.

The elongate vertical support member 118 of the flagpole security camera system 100, which may taper from a wider bottom portion 116 of the elongate vertical support member 118 to a narrower top portion 122, offers significant structural advantages in withstanding severe weather, high winds, and other external forces. This tapered design reduces the wind load on the flagpole by decreasing the surface area exposed to high winds as the height of the pole increases. The reduced wind resistance at the top portion 122 minimizes the bending moment at the base of the pole, thereby lowering the stress on the entire structure.

Structurally, the gradual reduction in diameter from the bottom portion 116 to the top portion 122 may provide a more balanced distribution of material strength along the length of the elongate vertical support member 118. The larger base provides a solid foundation to counteract the forces exerted by high winds, while the narrower top portion, with its reduced mass, decreases the overall weight of the pole, reducing the risk of buckling or collapse under load. This design enhances the pole's ability to flex slightly under wind pressure, dissipating energy more effectively and preventing catastrophic failure.

The tapered shape may also allow the elongate vertical support member 118 to maintain its aesthetic appearance without compromising on strength or durability. By concentrating the material where it is most needed at the base while reducing unnecessary bulk at the top, the elongate vertical support member 118 achieves an optimal balance between robustness and material efficiency. This design not only ensures that the flagpole can withstand adverse environmental conditions but also extends the longevity of the flagpole security camera system 100 by reducing wear and tear on the structure over time.

Figure 1B:
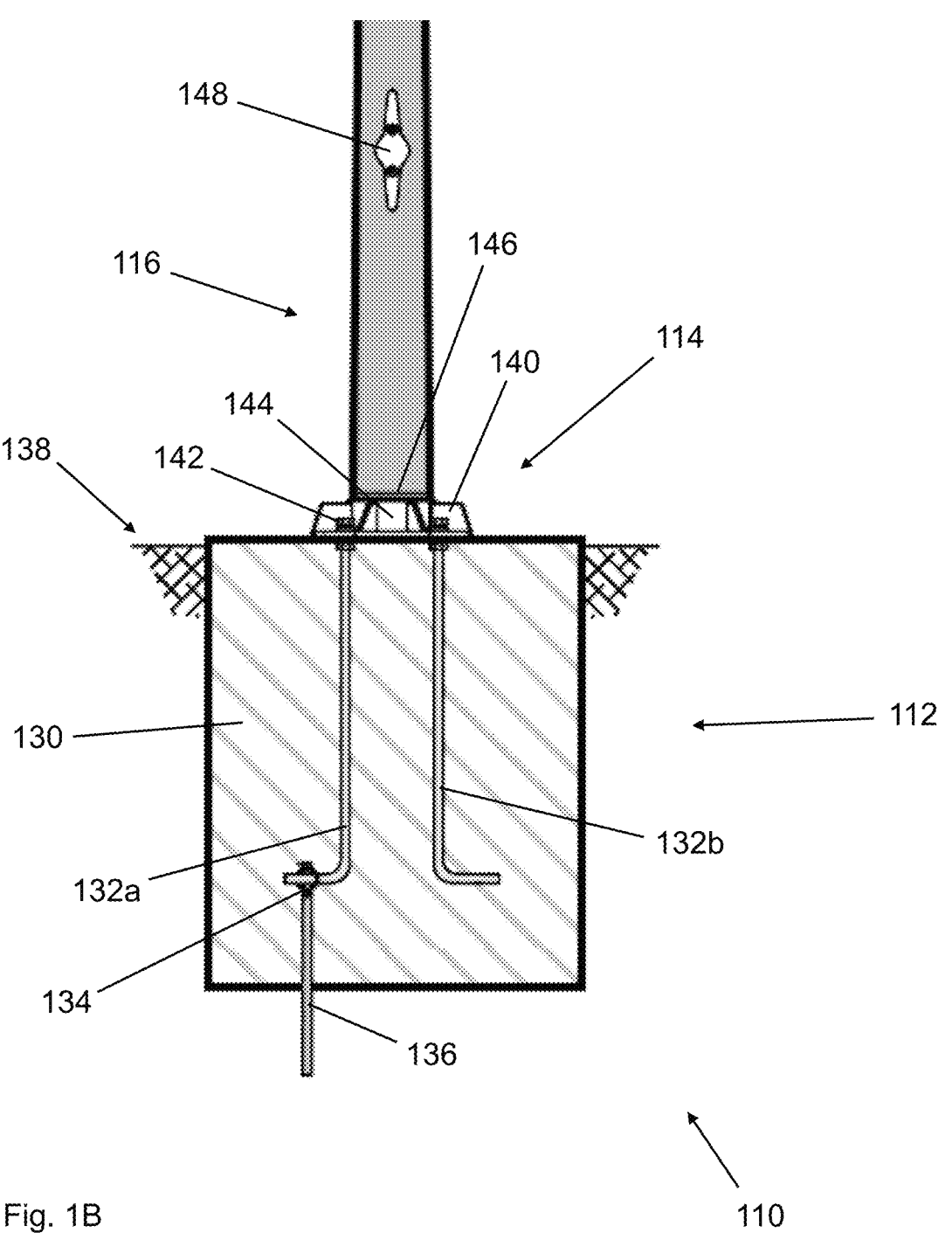
FIG. 1B illustrates a detailed elevational view of a bottom portion of a flagpole security camera system secured within an anchor structure shown in phantom in accordance with some embodiments of the present invention.

As shown in FIG. 1B, a detailed elevational view of a bottom portion 110 of a flagpole security camera system 100 secured within an anchor structure 112 shown in phantom is provided. The bottom portion 110 may comprise the anchor structure 112 supporting a base support structure 114 which secures a bottom portion of an elongate vertical support member 118 in place to orient the flagpole security camera system 100 in parallel with a vertical axis running through the width-wise midpoint of the member 118. The anchor structure 112 can potentially be constructed from various materials and designed with different structural features to enhance stability and durability.

The anchor structure 112 may be made from high-strength materials such as reinforced concrete, steel-reinforced polymer, or composite materials, providing a robust foundation capable of withstanding substantial environmental stresses, including high winds and seismic activity. The structure may incorporate deep foundation elements, such as pilings or footings, to anchor the system securely into the ground, thereby preventing tipping or displacement. Additionally, the anchor structure 112 may be designed with integrated drainage channels to manage water runoff and prevent pooling around the base, which could compromise the stability of the flagpole security camera system 100.

Functionally, the anchor structure 112 may serve to provide a solid and stable base for the flagpole security camera system 100, ensuring that it remains upright and properly oriented regardless of external forces. It also may distribute the load of the flagpole and camera system evenly across the foundation, reducing the risk of structural failure. By incorporating materials and design features that enhance durability and stability, the anchor structure 112 may play a critical role in maintaining the operational integrity and effectiveness of the flagpole security camera system 100.

Further, the anchor structure 112 shown in cross-section may comprise a fill material 130 that houses a plurality of elongate retention elements 132*a*, 132*b* to secure the base support structure 114 to the fill material 130. One or more of the elongate retention elements 132*a*, 132*b* may comprise a grounding rod 136 attached thereto via a coupling element 134. The grounding rod 136 may be partially disposed in the fill material 130 and partially disposed in a ground medium 138. Further, the anchor structure 112 as a whole may be disposed within the ground medium 138 and may be surrounded on at least five sides by the ground medium 138 as shown in FIG. 1B.

The base support structure 114 may comprise a plurality of threaded coupling elements 142 that allow the structure 114 to be securely coupled to each of the plurality of elongate retention elements 132*a*, 132*b*. Further, the base support structure 114 may utilize a plurality of flanges 140 extending radially away from a central hub 144. The central hub 144 may comprise an aperture disposed vertically therein and shaped to accept the bottom terminal extent of the bottom portion of the elongate vertical support member 118. A coupling interface 146 may be present at the joint formed by the bottom portion of the elongate vertical support member 116 being disposed adjacent the central hub 144. Additionally, a cleat 148 may be disposed upon and in vertical parallel relative the elongate vertical support member 118.

Figure 1C:
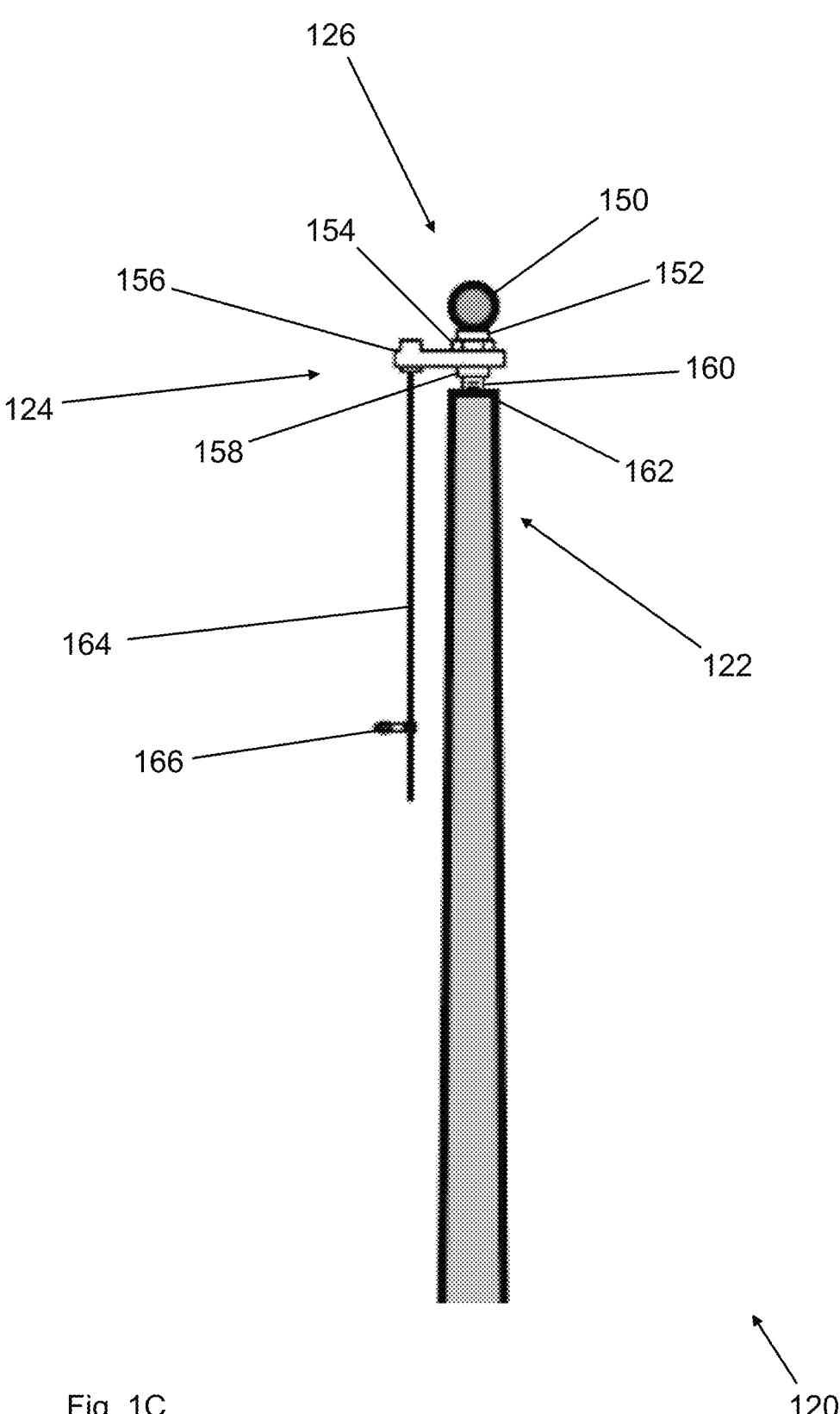
FIG. 1C illustrates a detailed elevational view of a top portion of a flagpole security camera system in accordance with some embodiments of the present invention.

As shown in FIG. 1C, a detailed elevational view of a top portion 120 of a flagpole security camera system 100 is provided. The top portion 120 of the flagpole security camera system 100 may comprise a top portion 122 of an elongate vertical support member 118 that comprises a revolving truck 124 and a camera system 126 at its distal terminal end. Specifically, the top portion 122 of the elongate vertical support member 118 may terminate into a distal terminal coupling interface 162 that may be shaped to accept a coupling conduit insert 160 therein. The coupling conduit insert 160 may be coupled to a bottom support flange 158 that is shaped to support the revolving truck 124 by keeping it at a stable vertical position while allowing it to rotate through 360 degrees in either rotational direction about a vertical axis running through the bottom support flange 158.

The revolving truck 124 may comprise a horizontal support structure 156 that has a halyard 164 and snap hook counterweight 166 extending downward from a terminal end of the structure 156 as shown in FIG. 1C. Further, the camera system 126 may comprise a camera element 150 that may take the form or a spherical or dome camera or any other camera that has the ability to rotate through 360 degrees in either direction. A top support flange 152 may structurally bear the load of the camera element 150 and be secured to the horizontal support structure 156 via a threaded coupling mechanism 154.

The revolving truck 124 may be constructed from durable, weather-resistant materials such as anodized aluminum, stainless steel, or high-strength composite materials. These materials may ensure that the truck remains operational in various environmental conditions, including high winds, precipitation, and temperature extremes. Further, the horizontal support structure 156 may be designed to provide a stable base for the revolving truck while allowing for smooth rotation around the vertical axis.

Functionally, the revolving truck 124 may enable the flagpole security camera system 100 to rotate freely which may provide comprehensive surveillance coverage of a given surveillance area through a 360 degree range. The integration of the halyard 164 and snap hook counterweight 166 into the horizontal support structure 156 may allow for the easy raising and lowering of the flag or other equipment which enhances the versatility of the system.

The camera system 126 and the camera element 150 may be designed as a high-resolution, panoramic camera capable of capturing images and videos from multiple angles. The camera element 150, in the form of a spherical or dome camera, may provide a full 360-degree field of view which ensures there are no blind spots in the surveillance area. The top support flange 152, bearing at least the load of the camera element 150, may be secured to the horizontal support structure 156 using a threaded coupling mechanism 154, which allows for easy attachment and detachment for maintenance or upgrades.

The coupling of the revolving truck 124 to the elongate vertical support member 118 may be facilitated by the coupling conduit insert 160 and the bottom support flange 158, which ensure that the truck remains securely in place while allowing for smooth rotational movement. This design may ensure that the camera system 126 can rotate independently of the elongate vertical support member 118, providing continuous monitoring of the surveillance area. The combination of these elements may result in a robust, versatile, and highly functional flagpole security camera system 100 that addresses many of the limitations of existing surveillance solutions.

Figure 2A:
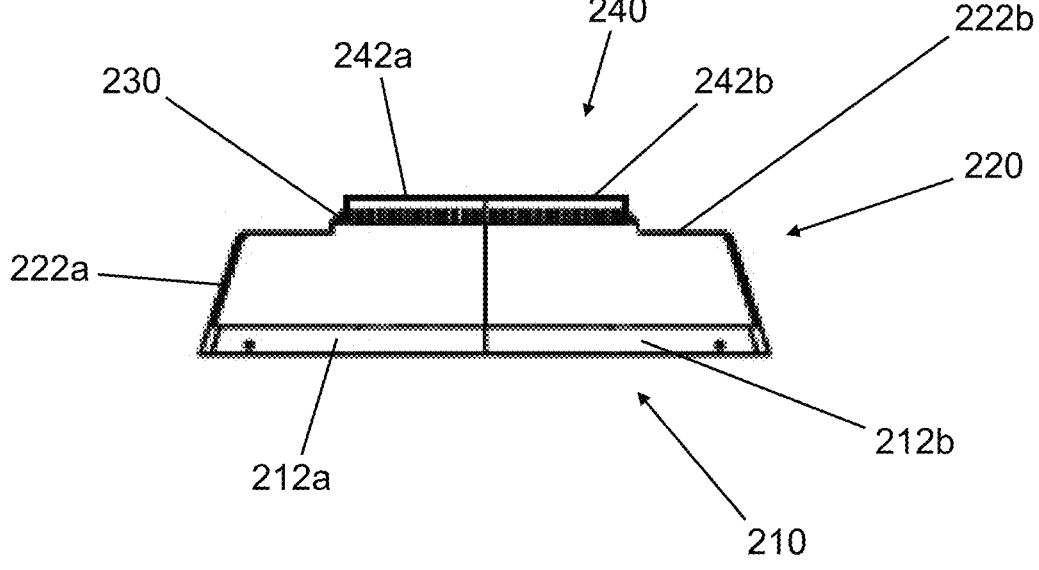
FIG. 2A illustrates an elevational view of a base support structure of a flagpole security camera system in accordance with some embodiments of the present invention.

As shown in FIG. 2A, an elevational view of a base support structure 200a of a flagpole security camera system is provided. The base support structure 200a may comprise a bottom coupling layer 210 constituted by a plurality of coupling portions 212a, 212b which may be used as the load-bearing substrates by which the flagpole security camera system is coupled to an anchor structure submerged within a ground medium. Each of the plurality of coupling portions 212a, 212b may comprise one or more apertures through which respective coupling mechanisms may be disposed therethrough in order to secure the flagpole security camera system to the anchor structure.

The base support structure 200a may further comprise a body portion 220 comprising a plurality of support flanges 222a, 222b extending radially out from a central hub 230 centered about a vertical axis running along the width-wise midpoint of the elongate cylindrical body of the flagpole security camera system. Further, the central hub 230 may comprise a coupling joint 240 constituted by a plurality of coupling interfaces 242a, 242b collectively forming an aperture therein which may be utilized to couple the base support structure 200a to the elongate cylindrical body of the flagpole security camera system.

The base support structure 200a can be constructed from various high-strength and weather-resistant materials, such as stainless steel, aluminum alloys, or reinforced composites. These materials may be chosen for their ability to withstand environmental stresses, including corrosion, temperature fluctuations, and mechanical wear. The support flanges 222a, 222b may be designed to distribute the load evenly across the base, providing stability and minimizing stress concentrations that could lead to structural failure.

Functionally, the base support structure 200a may serve as a critical component in maintaining the vertical alignment and stability of the flagpole security camera system. The central hub 230, with its coupling joint 240, allows for secure attachment to the elongate cylindrical body of the flagpole, ensuring that the camera system remains firmly in place. The coupling interfaces 242a, 242b are designed to accommodate various fastening mechanisms, such as bolts, clamps, or threaded connections, providing flexibility in installation and maintenance.

The coupling joint 240 may also incorporate features such as shock-absorbing materials or vibration dampers to mitigate the impact of external forces, such as wind or accidental impacts, thereby enhancing the longevity and reliability of the system. The precise alignment facilitated by the central hub 230 may ensure that the flagpole security camera system operates optimally, with the camera maintaining its intended orientation and field of view. By integrating these structural and functional elements, the base support structure 200a may play an important role in the overall performance and durability of the flagpole security camera system.

Figure 2B:
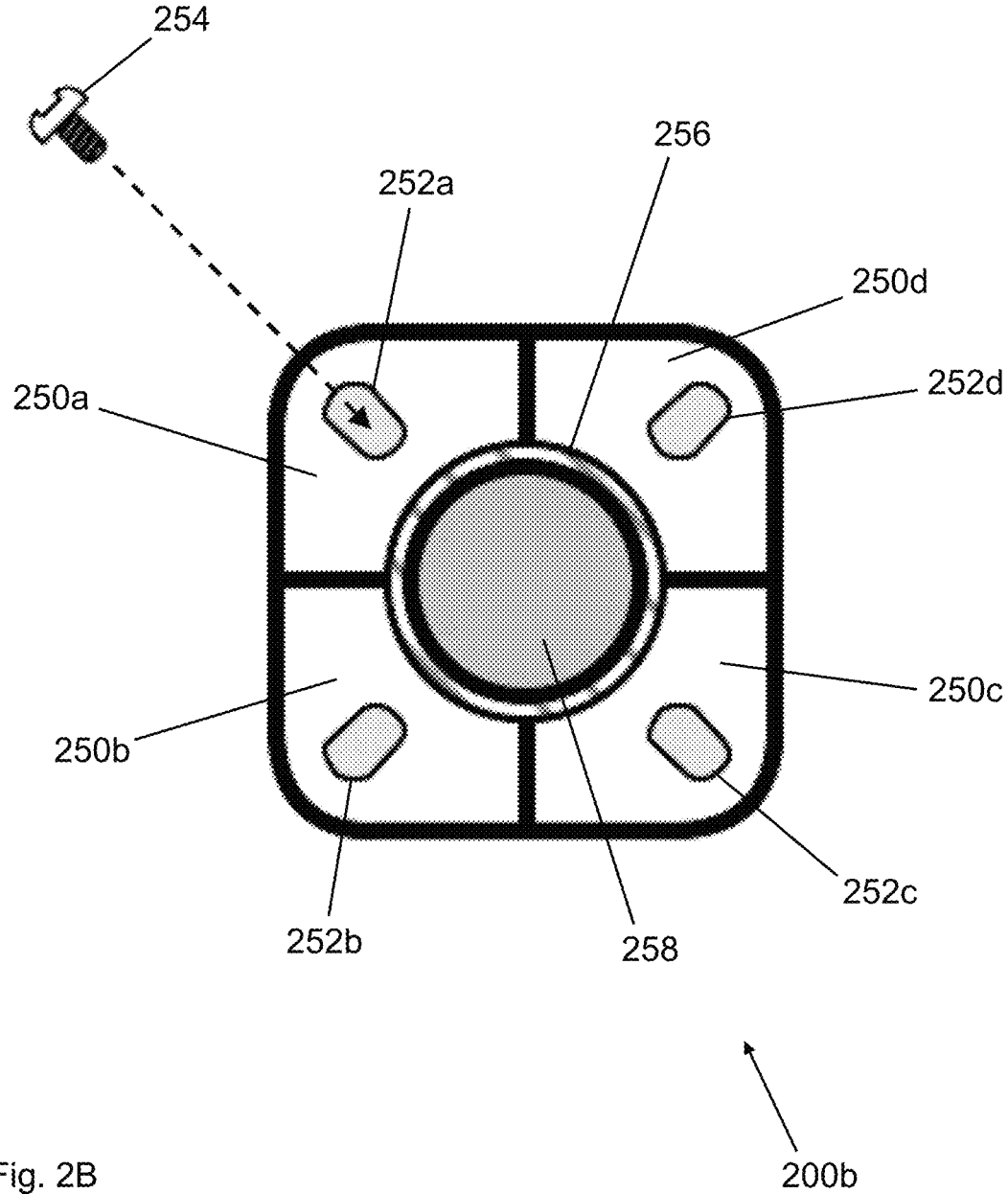
FIG. 2B illustrates an overhead view of a base support structure of a flagpole security camera system in accordance with some embodiments of the present invention.

As shown in FIG. 2B, an overhead view of a base support structure 200b of a flagpole security camera system is provided. The base support structure 200b may comprise a plurality of substrate support flanges 250a-250d that act not only as a load-bearing substrate but the flanges also act as a means of distributing load evenly across the entirety of the base support structure 200b. Each of the plurality of substrate support flanges 250a-250d may comprise at least one aperture 252a-252d through which respective coupling elements 254 may be inserted to couple the base support structure 200b to an anchor structure and/or to an elongate body of the flagpole security camera system.

The base support structure 200b may further comprise a central hub structure 256 that contains a cavity 258 disposed therethrough. The flange structures from the plurality of substrate support flanges 250a-250d may extend radially away in a symmetric manner from the central hub structure 256. The symmetric radial arrangement of the substrate support flanges 250a-250d around the central hub structure 256 may allow for the effective distribution of loads applied to the flagpole security camera system.

By extending outward in multiple directions, the flanges 250a-250d provide multidirectional load-bearing support, which may effectively counteract forces from various angles, including wind loads and other environmental forces. This configuration may ensure that the structural integrity of the flagpole is maintained under dynamic loading conditions, reducing the risk of tilting or bending. Each flange's aperture 252a-252d may allow for secure coupling with anchor structures, enhancing the overall stability of the system. The coupling elements 254, when inserted through these apertures, may create a rigid connection that helps to distribute both vertical and horizontal loads evenly across the entire base support structure. This multidirectional support system may ensure that the flagpole remains upright and stable, providing reliable performance and durability under a wide range of environmental conditions.

Figure 3:
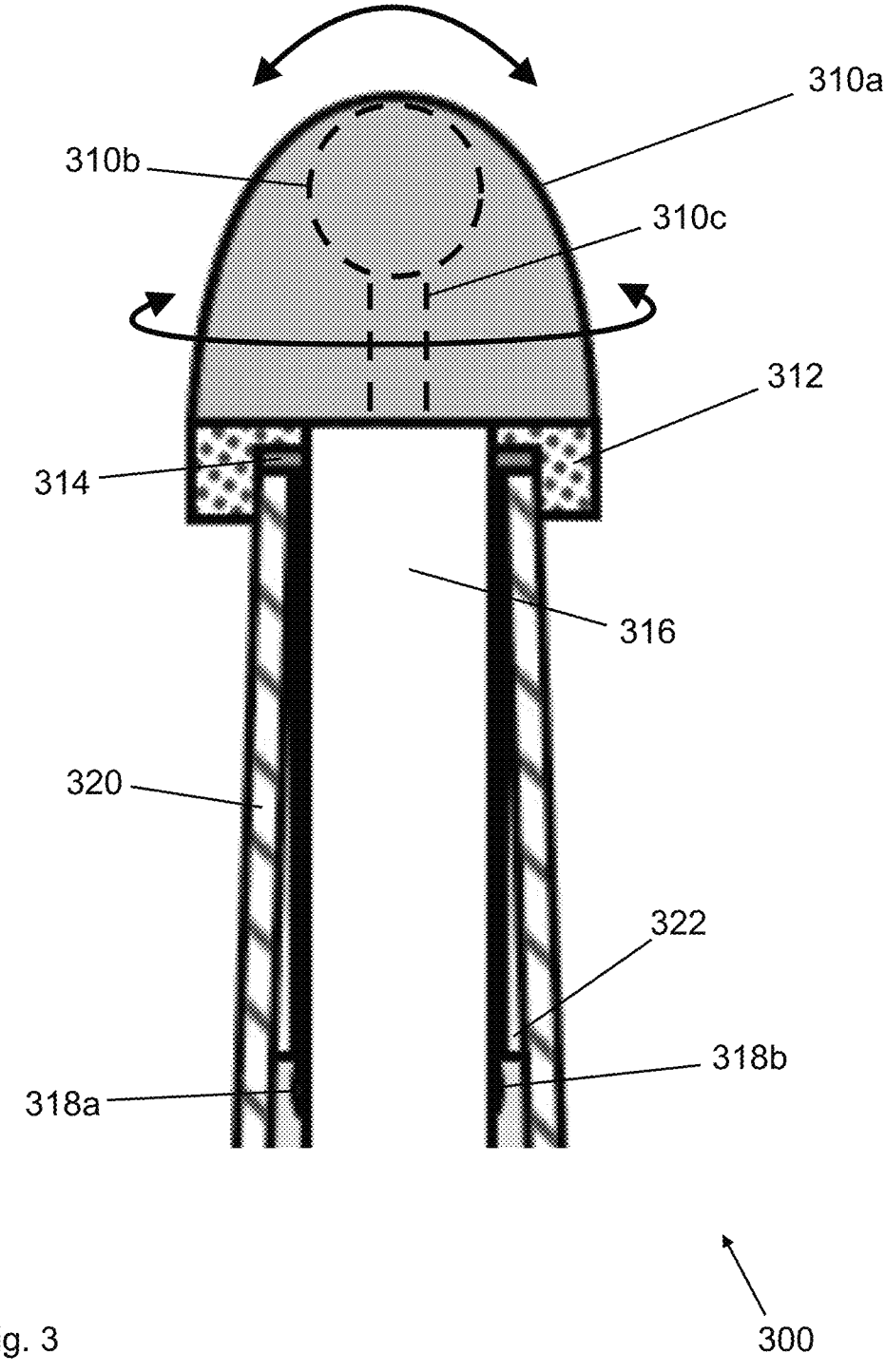
FIG. 3 illustrates a partial cross-sectional elevational view of a top portion of a flagpole security camera system in accordance with some embodiments of the present invention.

As shown in FIG. 3, a partial cross-sectional elevational view of a top portion of a flagpole security camera system 300 is provided. The top portion of the flagpole security camera system 300 may comprise a camera system constituted by a protective transparent housing 310a, a camera element 310b, and an adjustable mounting stem 310c. The camera element 310b and the adjustable mounting stem 310c are contained within the protective transparent housing 310a. The protective transparent housing 310a may couple to a mounting flange 312 in order to support the housing 310a and to allow the camera element 310b to have a field of view that includes areas near the base of the flagpole security camera system 300.

The mounting flange 312 may create a fluid seal via a gasket or o-ring 314 with an outer body 320 of an elongate vertical support member of the flagpole security camera system 300. A conduit 316 may be disposed within a cavity formed within the outer body 320 such that it may carry power and/or data transmission lines to and from the camera element 310b and the adjustable mounting stem 310c. The conduit 316 may comprise a plurality of compressible tabs 318a, 318b that may lock into place upon moving past corresponding structural detents 322 which removably secure the tabs 318a, 318b in place to prevent dust and debris from entering the cavity of the outer body 320 and/or the conduit 316 and protective transparent housing 310a.

The protective transparent housing 310a may be constructed from high-durability materials such as polycarbonate or tempered glass. These materials may provide the necessary strength and transparency to protect the internal components while allowing for clear imaging. The housing 310a may function as a barrier against environmental elements such as rain, dust, and physical impacts, ensuring the longevity and reliability of the camera element 310b. The adjustable mounting stem 310c, made from corrosion-resistant metals or reinforced polymers, may allow for precise positioning of the camera element 310b, enabling optimal viewing angles for comprehensive surveillance coverage.

The mounting flange 312, which may be made from stainless steel or anodized aluminum, may provide a robust connection point for the protective transparent housing 310a. It may be designed to create a fluid seal via a gasket or o-ring 314, which may be composed of silicone or EPDM rubber. This seal may prevent water and dust ingress, protecting the internal electronics of the camera system from environmental damage. The flange may also ensures that the camera element 310b remains securely attached to the outer body 320 of the elongate vertical support member.

A conduit 316 may be disposed within a cavity formed within the outer body 320, which can be constructed from weather-resistant materials such as galvanized steel or high-strength composites. The conduit 316 may be designed to carry power and/or data transmission lines to and from the camera element 310b and the adjustable mounting stem

310c. This ensures continuous operation and connectivity of the camera system. The conduit may include a plurality of compressible tabs 318a, 318b, which can be made from flexible yet durable plastics or metals. These tabs may lock into place upon moving past corresponding structural detents 322, which are integrated into the design of the outer body 320. This locking mechanism may securely hold the conduit in place, preventing dust and debris from entering the cavity and ensuring the integrity of the power and data lines.

Functionally, the conduit 316 may serve as a protected pathway for electrical and data connections, ensuring the camera system remains operational and connected to its control systems. The compressible tabs 318a, 318b and the structural detents 322 may work together to provide a secure and stable connection, preventing any unwanted movement or disconnection that could disrupt the system's power and data transmission functionality. By maintaining a clean and secure environment within the cavity of the outer body 320, the system may ensure reliable performance and reduce the need for frequent maintenance.

Figure 4:
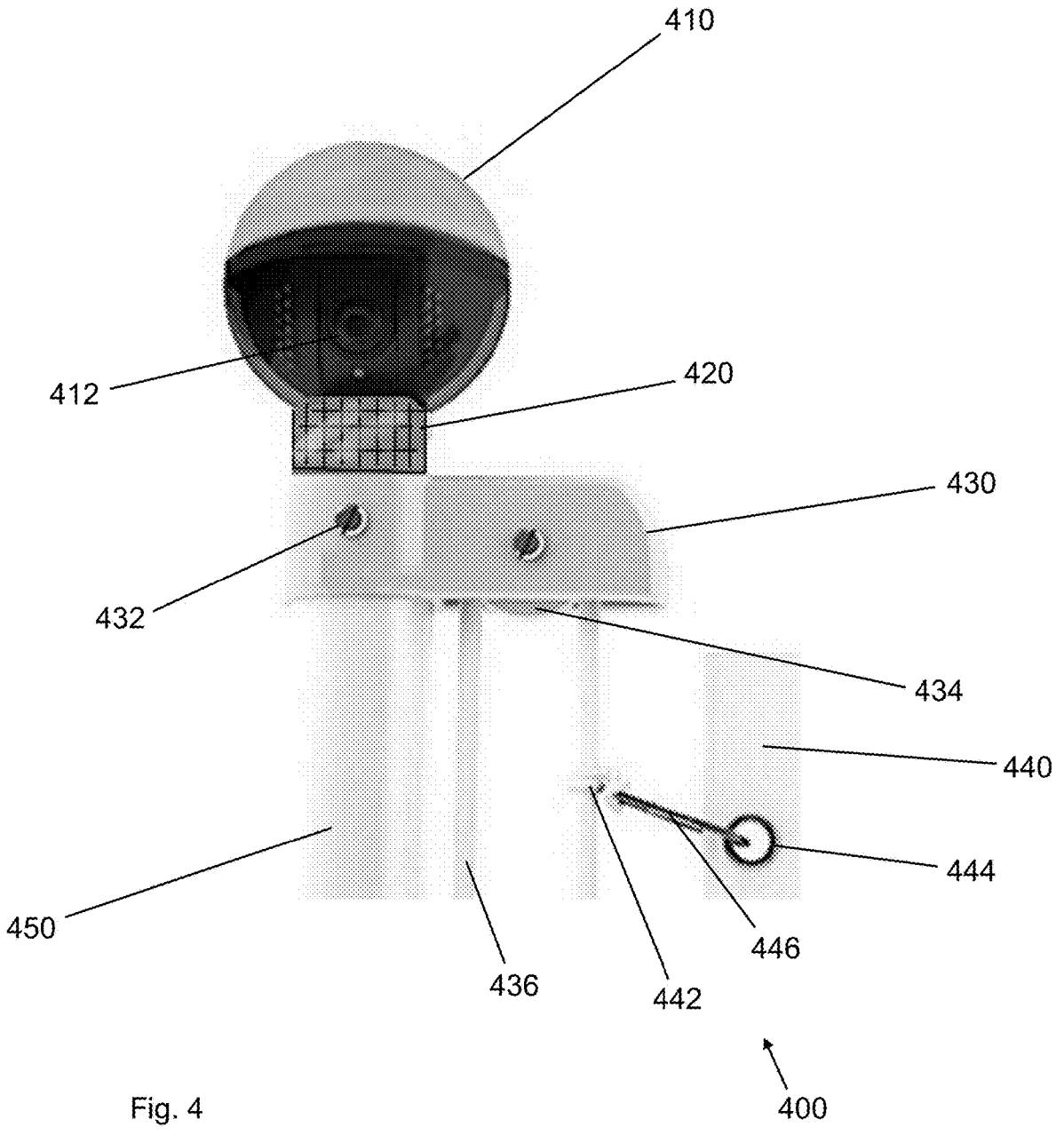
FIG. 4 illustrates an elevational view of a top portion of a flagpole security camera system having a photovoltaic panel disposed thereunder in accordance with some embodiments of the present invention.

As shown in FIG. 4, an elevational view of a top portion of a flagpole security camera system 400 having one or more photovoltaic panels 420 disposed thereunder is provided. The flagpole security camera system 400 may comprise a curved camera housing 410 containing a camera system 412 which may be powered via one or more photovoltaic panels 420. A revolving truck 430 may be coupled to an outer body of an elongate vertical support member 450 via one or more coupling mechanisms 432. A halyard 436 and pulley 434 combination may be utilized to secure a flag to the elongate vertical support member 450 via a coupling clasp 446 securing a coupling knot 442 of the halyard 436 to a grommet 444 of a flag 440.

The curved camera housing 410 may be constructed from durable, weather-resistant materials such as polycarbonate, ABS plastic, or anodized aluminum. These materials may provide the necessary protection for the camera system 412 against harsh environmental conditions, such as rain, dust, and UV exposure, while also allowing for an aesthetically pleasing design. The housing's curved shape may be designed to minimize wind resistance and reduce the accumulation of debris, ensuring clear visibility for the camera system 412.

The camera system 412 contained within the housing 410 may be powered by one or more photovoltaic panels 420. These panels may be made from high-efficiency monocrystalline or polycrystalline silicon cells to provide enhanced durability and energy conversion efficiency. The photovoltaic panels 420 may be strategically positioned to maximize sunlight exposure, allowing them to generate sufficient power to operate the camera system 412 continuously. This renewable energy source may reduce the reliance on external power supplies and enhance the sustainability of the flagpole security camera system 400.

The revolving truck 430 may allow the top portion of the flagpole to rotate, providing the camera system 412 with a 360-degree field of view. This truck 430 may be made from corrosion-resistant metals such as stainless steel or brass, ensuring longevity and smooth operation. The coupling mechanisms 432 may secure the revolving truck 430 to the outer body of the elongate vertical support member 450, providing a stable and secure connection. These mechanisms may include threaded couplings, clamps, or quick-release fasteners, made from durable materials like stainless steel or reinforced polymer composites.

The halyard 436 and pulley 434 combination may be used to raise and lower the flag 440, providing an easy and efficient way to manage the flag's position. The halyard 436 may be made from high-strength, UV-resistant rope or cord, ensuring it can withstand outdoor conditions and heavy use. The pulley 434, made from metals or reinforced plastics, may ensure smooth operation and reduces friction, making it easier to hoist the flag.

The coupling clasp 446 may secure the coupling knot 442 of the halyard 436 to the grommet 444 of the flag 440. This clasp may be made from robust materials like stainless steel or brass, ensuring a secure attachment that can resist strong winds and other environmental stresses. The grommet 444 may be reinforced with metal or plastic rings to ensure the flag 440 can be securely attached to the halyard 436 without risk of tearing.

The elongate vertical support member 450, which supports the entire system, may be constructed from high-strength materials such as stainless steel, aluminum, or fiber-reinforced composites. These materials may provide the necessary strength and rigidity to withstand various environmental loads, including wind, precipitation, and other external forces incident upon the system 400. The support member 450 may serve as the primary structural element, ensuring the stability and proper functioning of the flagpole security camera system 400.

Figure 5:
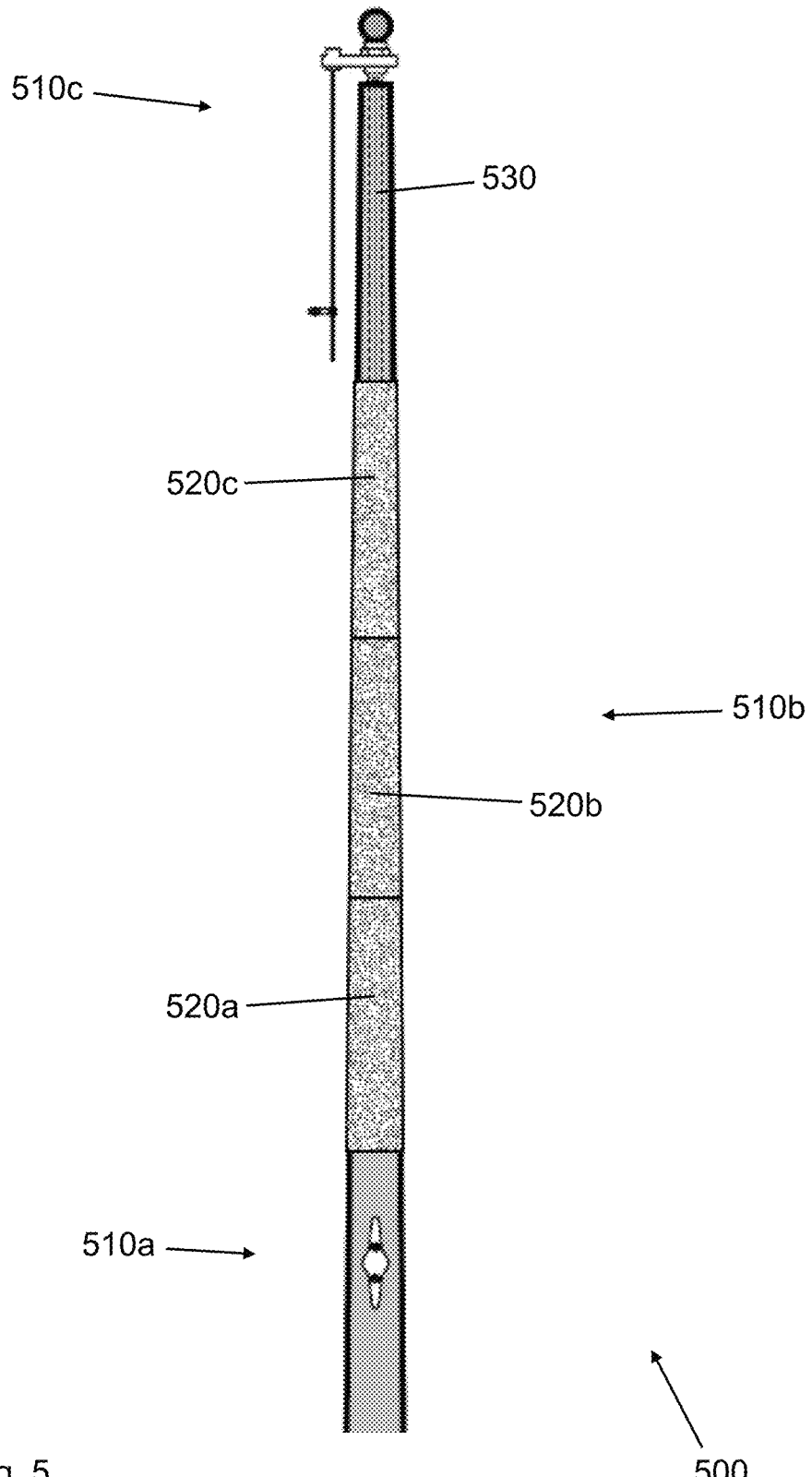
FIG. 5 illustrates an elevational view of a middle and top portion of a flagpole security camera system having a photovoltaic layer disposed around an elongate vertical support member in accordance with some embodiments of the present invention.

As shown in FIG. 5, an elevational view of bottom, middle and top portions 510a-510c of a flagpole security camera system 500 having a plurality of photovoltaic layer sections 520a-520c disposed around an elongate vertical support member is provided. The plurality of photovoltaic layer sections 520a-520c may be disposed generally within the middle portion 510b of the flagpole security camera system 500. A conduit 530 is shown in phantom as running through a cavity disposed within the body of the flagpole.

The plurality of photovoltaic layer sections 520a-520c may be constructed using advanced photovoltaic technologies such as thin-film solar cells or flexible solar coatings. These sections may be made from materials like amorphous silicon, cadmium telluride (CdTe), or copper indium gallium selenide (CIGS), which offer high efficiency and flexibility. These photovoltaic layers may be designed to capture sunlight and convert it into electrical energy, providing a sustainable power source for the flagpole security camera system 500.

The photovoltaic layer sections 520a-520c may be applied to the flagpole body in various ways. In one embodiment, a thin-film photovoltaic coating may be utilized, which can be sprayed or rolled onto the surface of the elongate vertical support member. This method may allow for a seamless integration of the solar cells with the flagpole, maintaining its aesthetic appearance while providing extensive coverage for energy harvesting. Alternatively, flexible photovoltaic panels may be wrapped around the flagpole body, secured in place with adhesives or mechanical fasteners. This method may enable easy installation and replacement of the solar panels, ensuring continuous operation of the system.

Structurally, the photovoltaic layer sections 520a-520c may be designed to be lightweight and flexible, minimizing the additional load on the flagpole while allowing it to bend and flex with environmental forces such as wind, debris, and objects kicked up in the air during storms. These layers may also be coated with one or more protective materials, such as ethylene-vinyl acetate (EVA) and polyethylene terephthalate (PET), to shield the photovoltaic cells from moisture, dust, and UV radiation, thereby enhancing their durability and lifespan.

Functionally, the photovoltaic layer sections 520a-520c may provide a distributed power generation system along the length of the flagpole. By capturing solar energy from different sections of the pole, the system may generate a consistent and reliable power supply, even if one section is shaded or partially obstructed. This redundancy may ensure that the camera system and other electronic components remain powered throughout the day.

The conduit 530, which may run through a cavity within the body of the flagpole, may serve as a protected pathway for power and data transmission lines. Constructed from durable, corrosion-resistant materials such as PVC or polyethylene, the conduit may ensure that electrical connections are safeguarded against environmental hazards. The cavity within the flagpole may provide an enclosed space for the conduit, protecting it from physical damage and ensuring a clean, streamlined appearance for the flagpole security camera system 500.

In some embodiments of FIGS. 1A-5, a flagpole security camera system is provided comprising an elongate vertical support member having a proximal terminal end and a distal terminal end, wherein: the proximal terminal end is coupled to a base support structure, the base support structure is coupled to one or more retention elements, and the distal terminal end is disposed adjacent a camera system and a revolving truck; an anchor structure comprising a fill material, wherein: the one or more retention elements are disposed within the fill material, and a grounding element is coupled to the one or more retention elements; and a photovoltaic element disposed adjacent the elongate vertical support member and in electrical communication with the camera system.

In some embodiments of FIGS. 1A-5, the elongate vertical support member comprises a bottom section, a middle section, and a top section, the bottom section of the elongate vertical support member comprises a cleat, the bottom section of the elongate vertical support member comprises a proximal terminal coupling interface, the proximal terminal coupling interface is disposed directly adjacent the base support structure, and a central hub of the base support structure comprises a cavity therein shaped to accept the distal terminal end of the elongate vertical support member at the proximal terminal coupling interface.

In some embodiments of FIGS. 1A-5, the base support structure comprises a plurality of coupling portions, the plurality of coupling portions are aligned in a horizontal plane and support a body portion of the base support structure, the central hub comprises a cylindrical shape centered about a vertical axis running through the cavity, the anchor structure comprises reinforced concrete, steel-reinforced polymer, composite materials or any combination thereof, the grounding rod is partially disposed in the fill material and partially disposed in a ground medium, and the anchor structure is entirely disposed within the ground medium.

In some embodiments of FIGS. 1A-5, the revolving truck rotates through 360 degrees in either rotational direction about a vertical axis oriented parallel to the elongate vertical support structure, the revolving truck is coupled to a halyard, the halyard is coupled to a snap hook counterweight, the distal terminal end of the elongate vertical support member comprises a distal terminal coupling interface, the distal terminal coupling interface is coupled to a coupling conduit insert, and the coupling conduit insert is disposed within a support member cavity and aligned along a vertical axis oriented parallel to the elongate vertical support structure.

In some embodiments of FIGS. 1A-5, a flagpole security camera system is provided comprising an elongate vertical support member having a proximal terminal end and a distal terminal end, wherein: the proximal terminal end is coupled to a base support structure, the base support structure is coupled to one or more retention elements, and the distal terminal end is disposed adjacent a camera system and a truck; an anchor element comprising a fill material, wherein: the one or more retention elements are disposed within the fill material, and a plurality of coupling portions of the base support structure secure the one or more retention elements to the base support structure; and a photovoltaic element disposed adjacent the elongate vertical support member and in electrical communication with the camera system, wherein: the photovoltaic element comprises one or more thin-film flexible solar cells disposed circumferentially around the entirety of the elongate vertical support member, and the one or more thin-film flexible solar cells comprises one or more of amorphous silicon, cadmium telluride, copper indium gallium selenide or any combinations thereof.

In some embodiments of FIGS. 1A-5, a flagpole security camera system is provided comprising an elongate vertical support member having a proximal terminal end and a distal terminal end, wherein: the proximal terminal end is coupled to a base support structure, the base support structure is coupled to one or more retention elements, and the distal terminal end is disposed adjacent a camera system and a truck; an anchor element comprising a fill material, wherein: the one or more retention elements are disposed within the fill material, and a plurality of coupling portions of the base support structure secure the one or more retention elements to the base support structure; and a photovoltaic element disposed adjacent the elongate vertical support member and in electrical communication with the camera system, wherein: the photovoltaic element may comprise a plurality of photovoltaic layer sections, the plurality of photovoltaic layer sections are applied to the elongate vertical support member via spray-coating or roll-coating, and the plurality of photovoltaic layer sections are coated with a protective UV-shielding coating.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All features disclosed in the specification, claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Throughout this disclosure, the phrase 'modularly coupled' and similar terms and phrases are intended to convey that any element of a given class of elements may be coupled to another given element and vice versa with equal effect. For example, any extension cord of a plurality of extension cords may be modularly coupled to another extension cord and vice versa with equal effect. Further, throughout this disclosure, the phrase 'removably coupled' and similar terms and phrases are intended to convey that a given element may be iteratively coupled to and removed from another given element as desired. For example, a male plug of a first extension cord may be removably coupled to a female plug of a second extension cord as desired.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "coupled" or "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A flagpole security camera system, comprising:
an elongate vertical support member having a proximal terminal end and a distal terminal end, wherein:
the elongate vertical support member comprises a bottom section, a middle section, and a top section,
the proximal terminal end is coupled to a base support structure,
the bottom section of the elongate vertical support member comprises a proximal terminal coupling interface disposed directly adjacent the base support structure,
a central hub of the base support structure comprises a cavity therein shaped to accept the distal terminal end of the elongate vertical support member at the proximal terminal coupling interface,
the base support structure is coupled to one or more retention elements, and
the distal terminal end is disposed adjacent a camera system and a revolving truck;
an anchor structure comprising a fill material, wherein:
the one or more retention elements are disposed within the fill material, and
a grounding element is coupled to the one or more retention elements; and
a photovoltaic element disposed adjacent the elongate vertical support member and in electrical communication with the camera system.

2. The flagpole security camera system of claim 1, wherein the bottom section of the elongate vertical support member comprises a cleat.

3. The flagpole security camera system of claim 1, wherein the base support structure comprises a plurality of coupling portions.

4. The flagpole security camera system of claim 3, wherein the plurality of coupling portions are aligned in a horizontal plane and support a body portion of the base support structure.

5. The flagpole security camera system of claim 1, wherein the anchor structure comprises reinforced concrete, steel-reinforced polymer, composite materials or any combination thereof.

6. The flagpole security camera system of claim 1, wherein the revolving truck rotates through 360 degrees in either rotational direction about a vertical axis oriented parallel to the elongate vertical support structure.

7. The flagpole security camera system of claim 6, wherein the revolving truck is coupled to a halyard.

8. The flagpole security camera system of claim 7, wherein the halyard is coupled to a snap hook counterweight.

9. The flagpole security camera system of claim 1, wherein the distal terminal end of the elongate vertical support member comprises a distal terminal coupling interface.

10. The flagpole security camera system of claim 9, wherein the distal terminal coupling interface is coupled to a coupling conduit insert.

11. The flagpole security camera system of claim 10, wherein the coupling conduit insert is disposed within a support member cavity and aligned along a vertical axis oriented parallel to the elongate vertical support structure.

12. A flagpole security camera system, comprising:
an elongate vertical support member having a proximal terminal end and a distal terminal end, wherein:
the proximal terminal end is coupled to a base support structure,
the base support structure is coupled to one or more retention elements, and
the distal terminal end is disposed adjacent a camera system and a truck;
an anchor element comprising a fill material, wherein:
the one or more retention elements are disposed within the fill material, and
a plurality of coupling portions of the base support structure secure the one or more retention elements to the base support structure; and
a photovoltaic element disposed adjacent the elongate vertical support member and in electrical communication with the camera system, wherein:
the photovoltaic element comprises one or more thin-film flexible solar cells disposed circumferentially around the entirety of the elongate vertical support member, and
the one or more thin-film flexible solar cells comprises one or more of amorphous silicon, cadmium telluride, copper indium gallium selenide or any combinations thereof.

13. A flagpole security camera system, comprising:
an elongate vertical support member having a proximal terminal end and a distal terminal end, wherein:
the proximal terminal end is coupled to a base support structure,
the base support structure is coupled to one or more retention elements, and
the distal terminal end is disposed adjacent a camera system and a truck;
an anchor element comprising a fill material, wherein:
the one or more retention elements are disposed within the fill material, and
a plurality of coupling portions of the base support structure secure the one or more retention elements to the base support structure; and
a photovoltaic element disposed adjacent the elongate vertical support member and in electrical communication with the camera system, wherein:
the photovoltaic element may comprise a plurality of photovoltaic layer sections, the plurality of photovoltaic layer sections are applied to the elongate vertical support member via spray-coating or roll-coating, and the plurality of photovoltaic layer sections are coated with a protective UV-shielding coating.

\* \* \* \* \*